United States Patent
Gelbaum

(10) Patent No.: US 10,208,909 B2
(45) Date of Patent: *Feb. 19, 2019

(54) PASSIVE SKYLIGHT WITH TWO PARABOLIC REFLECTOR SEGMENTS

(71) Applicant: Entech Solar, Inc, Krum, TX (US)

(72) Inventor: David Gelbaum, Costa Mesa, CA (US)

(73) Assignee: Entech Solar, Inc, Krum, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,324

(22) Filed: Jun. 8, 2018

(65) Prior Publication Data

US 2018/0363871 A1    Dec. 20, 2018

Related U.S. Application Data

(63) Continuation of application No. 15/442,232, filed on Feb. 24, 2017.

(60) Provisional application No. 62/347,497, filed on Jun. 8, 2016, provisional application No. 62/405,603, filed on Oct. 7, 2016.

(51) Int. Cl.
*F21S 11/00* (2006.01)
*G02B 19/00* (2006.01)
*E04D 13/03* (2006.01)

(52) U.S. Cl.
CPC .......... *F21S 11/002* (2013.01); *E04D 13/033* (2013.01); *G02B 19/0028* (2013.01); *G02B 19/0042* (2013.01)

(58) Field of Classification Search
CPC .............................. F21S 11/002; F21S 11/007
See application file for complete search history.

(56) References Cited

U.S. PATENT DOCUMENTS

| | | | |
|---|---|---|---|
| 1,158,626 A | | 11/1915 | Brooks |
| 1,220,219 A | | 3/1917 | Goldman |
| 1,254,520 A | * | 1/1918 | MacDuff ............... F21S 11/00 359/592 |
| 4,428,358 A | | 1/1984 | Adamson |
| 4,820,020 A | | 4/1989 | Terrill |
| 5,408,795 A | | 4/1995 | Eljadi |
| 5,467,564 A | | 11/1995 | DeKeyser |
| 5,568,832 A | | 10/1996 | Eddy |
| 5,648,873 A | | 7/1997 | Jaster et al. |
| 6,219,977 B1 | | 4/2001 | Chao |
| 6,348,910 B1 | | 8/2002 | Erskine |
| 6,918,216 B2 | | 7/2005 | Hoy |
| 7,395,636 B2 | | 4/2008 | Blomberg |
| 7,410,284 B2 | | 8/2008 | Edmonds |
| 7,430,077 B2 | | 9/2008 | Briee |

(Continued)

FOREIGN PATENT DOCUMENTS

DE    202012006498 U1 *  7/2012  ............ F21S 11/007
WO         9516100            6/1995

(Continued)

*Primary Examiner* — Christopher Mahoney
(74) *Attorney, Agent, or Firm* — Thomas Coester Intellectual Property

(57) ABSTRACT

The present subject matter is an improved skylight to improved low sun-angle light collection and reduced high sun angle light and heat collection. A steeply sloping dome contains parabolic reflectors that redirect low elevation light into a light passage. The steeply sloping sides and the reflectors reflect high elevation angle rays away from a light passage.

16 Claims, 12 Drawing Sheets

(56) References Cited

U.S. PATENT DOCUMENTS

| | | | |
|---|---|---|---|
| 7,639,423 B2 | 12/2009 | Kinney et al. | |
| 7,982,956 B2 | 7/2011 | Kinney | |
| 8,797,652 B2 | 8/2014 | Mosher | |
| 8,934,173 B2 | 1/2015 | Vasylyev | |
| 9,194,128 B1 | 11/2015 | Fawley | |
| 9,416,542 B2 | 8/2016 | Gelbaum | |
| 9,765,522 B2 | 9/2017 | Bilbrey | |
| 2003/0159364 A1 | 8/2003 | Piano | |
| 2004/0100698 A1* | 5/2004 | Aoki | E04D 13/033 359/591 |
| 2007/0180789 A1 | 8/2007 | Valentz | |
| 2010/0132279 A1 | 6/2010 | Valentz | |
| 2011/0289870 A1 | 12/2011 | Nemazi | |
| 2013/0314795 A1 | 11/2013 | Weaver | |
| 2016/0076252 A1* | 3/2016 | Gelbaum | E04D 13/033 359/591 |
| 2016/0169465 A1* | 6/2016 | Jones | G02B 6/0008 359/594 |
| 2017/0009947 A1* | 1/2017 | Jaster | F21S 11/002 |

FOREIGN PATENT DOCUMENTS

| | | |
|---|---|---|
| WO | 2005005745 | 1/2005 |
| WO | 2012161765 | 11/2012 |

* cited by examiner

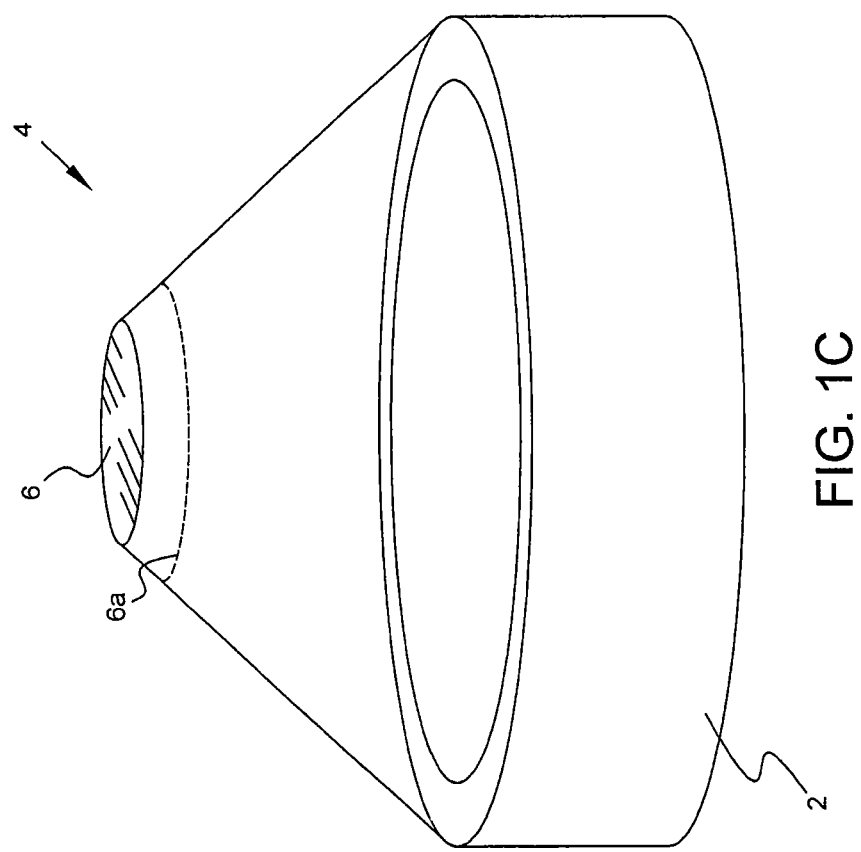

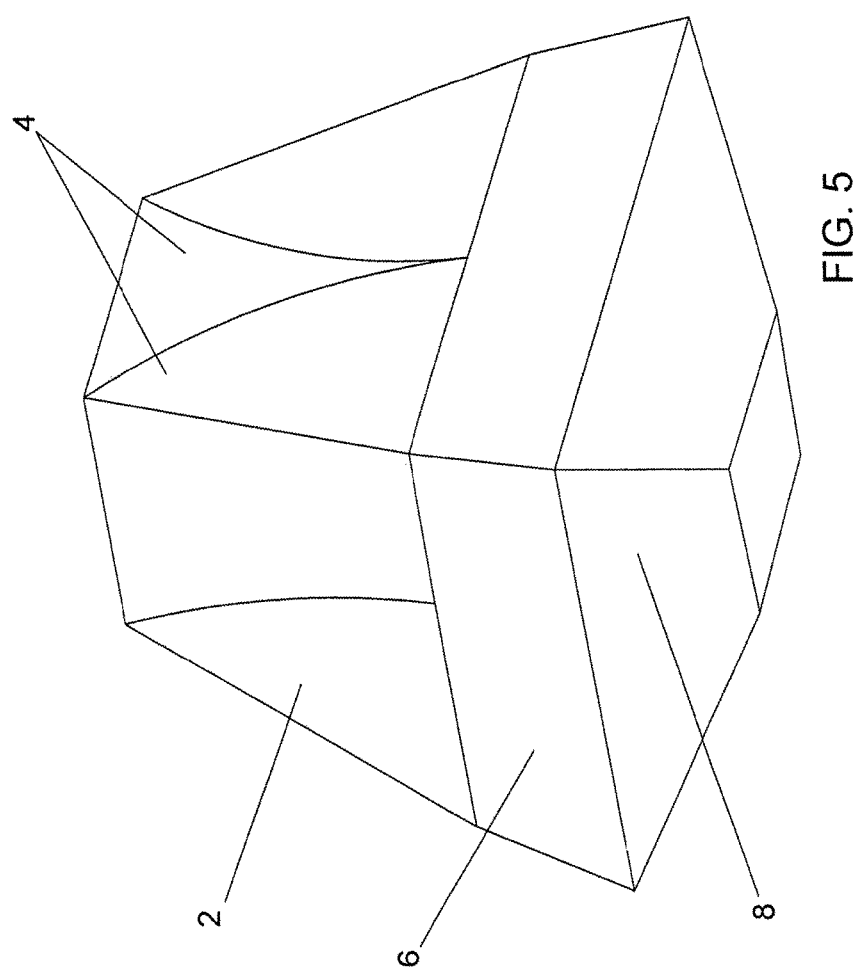

PASSIVE SKYLIGHT WITH TWO PARABOLIC REFLECTOR SEGMENTS

RELATED APPLICATIONS

This application is a continuation of Ser. No. 15/442,232 entitled Skylight with Two Parabolic Reflector Segments Facing Two Horizon Directions Inside a Truncated Pyramid Dome Mounted on a Collimating Curb with a Dual-Pane Diffuser at the Bottom filed on Feb. 24, 2017 which is non-provisional of and claims benefit of U.S. Provisional application No. 62/347,497 filed on 8 Jun. 2016 and provisional application No. 62/405,603 filed on 7 Oct. 2016.

BACKGROUND

Conventional horizontal skylights suffer from poor sunlight collection when the sun is low in the sky, i.e., when the sun's elevation angle is small. This poor low-sun-angle performance leads to poor lighting in the wintertime in most moderate latitudes, and to poor lighting early and late in the day in all locations. Previous attempts to solve this problem have sometimes used fixed reflectors or prismatic lenses above the skylight penetration with less than adequate performance. None of these previous attempts to solve the low sun angle inadequate sunlight collection problem have proven successful commercially.

Conventional horizontal skylights also suffer from excess sunlight collection near solar noon in the summer months, i.e., when the sun's elevation is high. This excess high sun angle performance leads to large solar heat gain in to the building below the skylight during peak air conditioning season, leading to very high peak cooling loads, which require greater air conditioning system capacity and investment, as well as higher electricity consumption and cost. Previous attempts to solve this problem have sometimes used expensive and complicated skylight blinds beneath the skylight, or an expensive electrochromatic or thermochromic glass layer in the skylight which changes transmission with the application of electrical current or with high ambient temperatures. None of these previous attempts to solve the high sun angle excess sunlight collection problem have proven successful commercially.

SUMMARY

The present subject matter solves both of these problems with a unique skylight comprising to parabolic reflector segments facing two opposing horizon directions inside a truncated pyramid dome mounted on a collimating curb with a dual-pane diffuser at the bottom.

Firstly, to improve low sun angle sunlight collection, the present subject matter uses two stationary horizon-facing parabolic reflectors aimed in opposite directions. These horizon-facing reflectors enhance the light output of the skylight by reflecting low sun angle sunlight into the roof opening beneath the skylight and into the building for illumination. The reflectors are typically made of low cost aluminum sheet with a specularly reflecting surface, and they serve to maximize the useful lumen output of the skylight early and late in the day throughout the year. Alternatively, the reflective surfaces can be made of any other suitable reflective material. The present subject matter furthermore improves the light distribution under the horizontal penetration by using the reflectors to direct light more vertically into the working space beneath the roof penetration rather than horizontally onto walls and into the building occupants' eyes, creating glare and discomfort.

Secondly, to reduce excess sunlight collection near solar noon in the summer months, the present subject matter also employs the parabolic reflectors as sun-shading devices for near-overhead light to prevent some of the high sun angle sunlight from ever reaching the roof opening beneath the reflectors. By blocking some of this high sun angle sunlight, the skylight thereby maintains adequate lighting within the building but reduces solar heat gain and air conditioning requirements and cost during the peak cooling season.

In addition to the parabolic reflectors, the present subject matter uses a collimating curb comprising tilted specularly reflective walls to further direct sunlight more vertically downward into the building below for illumination.

To maximize sunlight collection from low sun angle rays, the present subject matter employs a truncated pyramid transparent dome rather than a conventional horizontal bubble-shaped dome. The pyramid shape minimizes reflection losses through the transparent dome for low sun angle light, by intercepting such light at smaller angles of incidence onto the transparent material, comprising the dome. The pyramid shape also reduces transmission through the dome for high sun angle light because the incidence angles of high sun angle light onto the steep sides of the pyramid will be high, resulting in lower transmission and thus low solar heat gain.

To minimize wasteful heat loss in winter and heat gain in summer, the present subject matter uses a double-pane diffuser at the bottom of the curb, to provide excellent dead-air-space thermal insulating effect for both the skylight dome and the curb.

The unique dual functionality of the present subject matter solves both the inadequate low sun angle sunlight collection problem and the excess high sun angle sunlight collection problem. Therefore, the present subject matter represents a unique new skylight to provide more and better lighting inside the building year-round, with less excess solar heat gain during the summer months.

This subject matter is a unique skylight comprising two parabolic reflector segments facing two opposing horizon directions inside a truncated pyramid dome mounted on a collimating curb with a dual-pane diffuser at the bottom of the curb. These various elements work together to provide a near-constant amount of illumination inside the building over the course of the daylight hours, and also reduce the solar heat gain in the summer air-conditioning season. Furthermore, the new skylight minimizes heat gain and heat loss between the outside environment and the building space. Still further, the skylight directs the light into the building more vertically as desired, minimizing glare and improving visual comfort for the occupants. The best configuration of the new skylight has been determined via hundreds of combined parametric analytical simulations and scale-model illumination tests, both of which simulate all of the hours of the day for all of the seasons of the year.

The disclosed subject matter improves both the quantity and quality of the natural lighting inside the building. The greater quantity of daylight early and late in the day saves more energy for conventional electrical lighting, improving the economics of the skylight, and the better quality of the light improves working conditions for the occupants of the building.

The disclosed subject matter enables more constant and adequate daylighting of the building throughout the daytime hours to save on electric lighting costs, while also saving air conditioning system capacity, cost and energy consumption compared to a conventional skylight.

The disclosed subject matter is able to provide both the low sun angle light collection function and the high sun angle light and solar heat gain reduction function, while also directing the light into a more beneficial pattern inside the building, all the time saving on heat loss and heat gain through the skylight.

BRIEF DESCRIPTION OF THE DRAWINGS

FIG. 1C is a perspective view of another embodiment of a skylight in which the dome is a truncated cone.

FIG. 5 presents a perspective view from below of an alternative to the preferred embodiment of the new skylight previously shown in FIG. 1, including a transparent dome shaped as a truncated pyramid, two horizon-facing parabolic reflectors arranged in V-shaped configuration inside the dome, a collimating curb with tilted reflective walls supporting the dome, and a dual pane diffuser assembly at the bottom of the curb, with the bottom diffuser having a truncated pyramidal shape instead of the flat sheet shape of FIG. 1A.

Figure 1A:
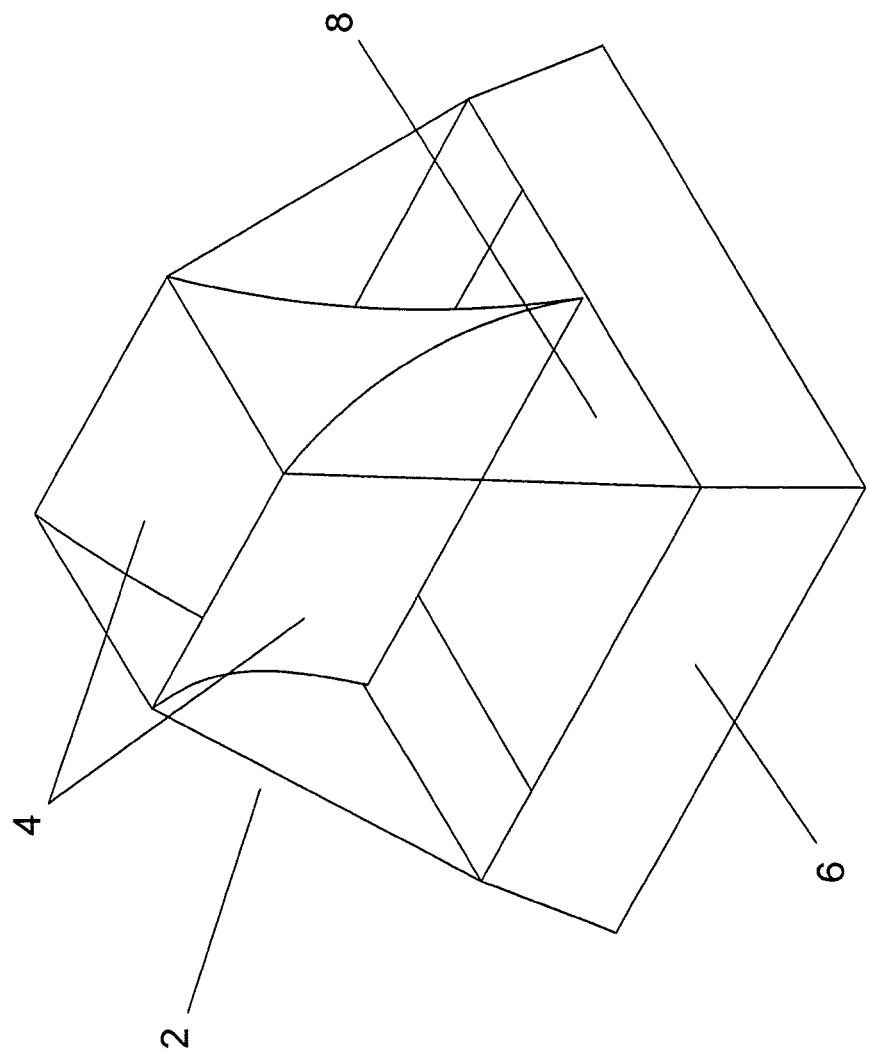
FIG. 1A is a perspective view of the preferred embodiment of a skylight, including a transparent dome shaped as a truncated pyramid, two horizon-facing parabolic reflectors arranged in a V-shaped configuration inside the dome, a collimating curb with tilted reflective walls supporting the dome, and a dual pane diffuser assembly at the bottom of the curb.

The present subject matter is best understood by referring to the five attached Figures. Referring first to the isometric view of FIG. 1, the new skylight is intended primarily for commercial, industrial, and institutional applications wherein the roof is generally close to horizontal and includes the usual construction of such roofs, an external weather-tight membrane, iso-foam insulation, a corrugated steel deck, and supporting structure of steel joists and beams. None of these features of the roof are critical to the present subject matter, so they are not shown in FIG. 1A.

The present skylight will finally include a transparent dome 2 which utilizes a truncated pyramid shape to minimize reflection losses for solar rays coming into the skylight from the low sun elevation angles near the horizon. The transparent dome 2 can be made from acrylic plastic or polycarbonate plastic by thermoforming. Inside the dome 2, two horizon-facing parabolic reflectors 4 are arranged in a generally V-shaped pattern, with the tops of the reflectors near the inside surface of the dome and with the bottoms of the reflectors near the top of the curb 6 which supports the dome and provides sealing against rain and air infiltration into the building below. The parabolic reflectors 4 are configured with specularly reflective surfaces facing the horizons, to allow for efficient collection and reflection of low sun angle rays into the building below. The parabolic reflectors 4 also provide a sun shade effect for high sun elevation angle light near solar noon in the summer months, thereby reducing solar heat gain and air conditioning load within the building. The curb 6 is configured to provide collimation of solar rays that intercept the curb, by utilizing a specularly reflective inner surface. At the bottom of the curb 6, dual-pane diffusers 8 are used to provide a dead-air-space thermal insulation effect to reduce heat loss in winter and heat gain in summer. In summary, the new skylight employs four elements to achieve among others its twin objectives of improved low sun-angle light collection and reduced high sun angle light and heat collection: (1) a transparent truncated pyramid-shaped dome 2, (2) two horizon-facing parabolic reflectors 4, (3) a collimating curb 6, and (4) a dual-pane diffuser assembly 8.

Low sun elevation angle light intercepts the horizon-facing reflectors 4, which typically face toward the east and west, respectively. The east-facing reflector, one of the pair 4, intercepts and reflects early morning sunlight into the building below, while the west-facing reflector, the other of the pair 4 intercepts and reflects late afternoon sunlight into the building below. Parametric studies have shown the that optical axis of the parabolic reflectors 4 should be horizontal with a focal point just inside the top of the curb 6, so that all rays with sun elevation angles above zero will be reflected into the top aperture of the curb 6.

High sun elevation angle light intercepts the back side of the parabolic reflectors 4, which thereby serve as opaque sun shades to prevent such high sun elevation angle light from entering the building below. This shading effect prevents excess illumination, which has no value, and high solar heat gain during the summer months near solar noon, thereby reducing air-conditioning loads and related costs for equipment and electrical power.

Parametric studies have shown that the relative geometry of the transparent dome 2, the horizon-facing parabolic reflectors 4, and the collimating curb 6 should be in certain proportions. For example, the height of the dome 2 should be approximately ⅔rds of the greatest width of the curb 6. The parabolic reflectors should extend from the top of the curb 6 to the top inner surface of the dome 2. For collimation, the curb 6 should be approximately 5-10% wider at its bottom than at its top.

To minimize heat loss in winter and heat gain in summer, two diffusers 8 should be used at the bottom of the collimating curb. One diffuser of the pair 8 may be optically clear while the second diffuser of the pair 8 should be translucent or otherwise light-diffusing in terms of its transmission of sunlight into the building.

Figure 1B:
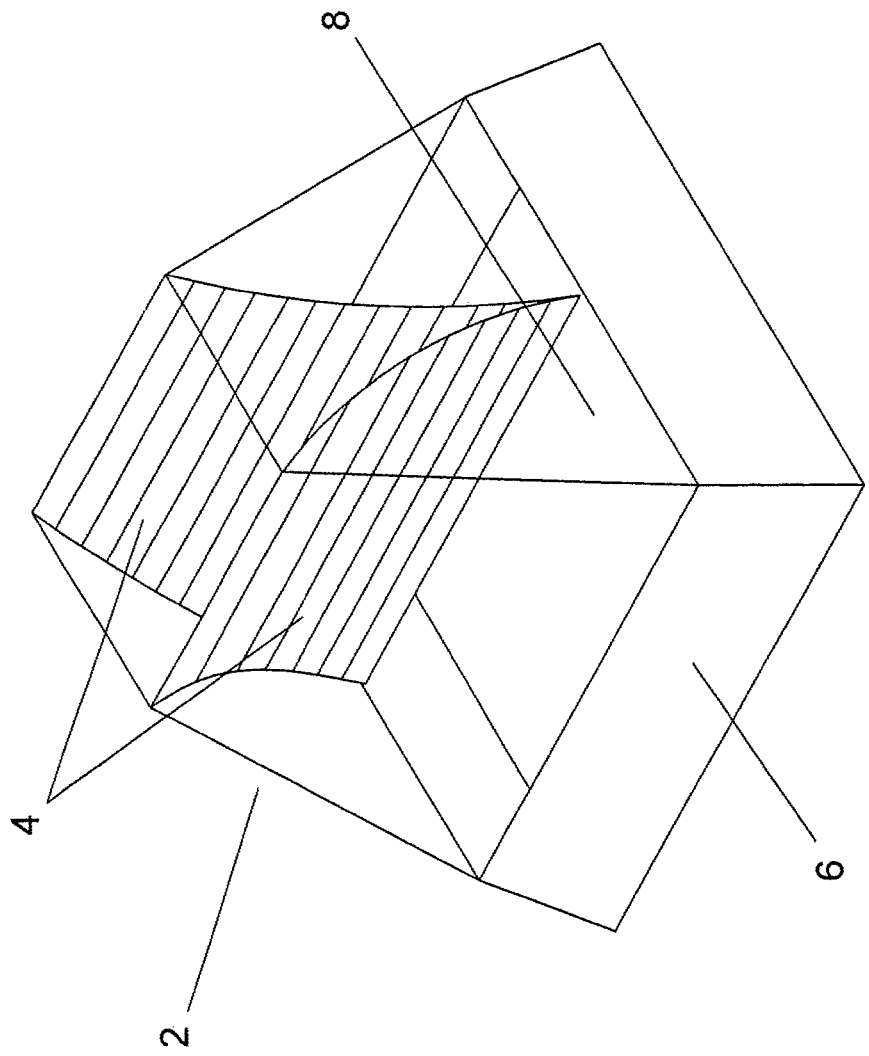
FIG. 1B is a perspective view of another embodiment of a skylight in which the parabolic reflectors are segmented.

The skylight shown in FIG. 1A is a preferred embodiment, but does not in any way limit the present subject matter to a rectangular shape. Other shapes and configurations may use the new combination of a relatively tall dome 2, horizon-facing parabolic reflectors 4, collimating curb 6, and two bottom diffusers 8. For example, the new subject matter may be alternatively implemented in round skylights, hexagonal skylights, oval skylights, triangular skylights, and such other geometries as those skilled in the arts will recognize. For round geometries, the truncated pyramidal shape of the dome 2 may be replaced with a truncated cone shape 12, as those skilled in the arts will recognize. The skylight shown in FIG. 1A is a preferred embodiment, but, as those of ordinary skill in the art will recognize, does not limit the present subject matter to the use of perfectly parabolic reflectors 4, which could instead be segmented flat reflectors as shown in FIG. 1B, approximating a parabolic shape or other reflector shapes accomplishing the same purpose of collecting and reflecting low sun elevation angle light into the skylight below. Such segmented reflectors or reflectors of other shapes as those of ordinary skill in the art may select clearly fall within the scope and spirit of the present subject matter.

Figure 3A:
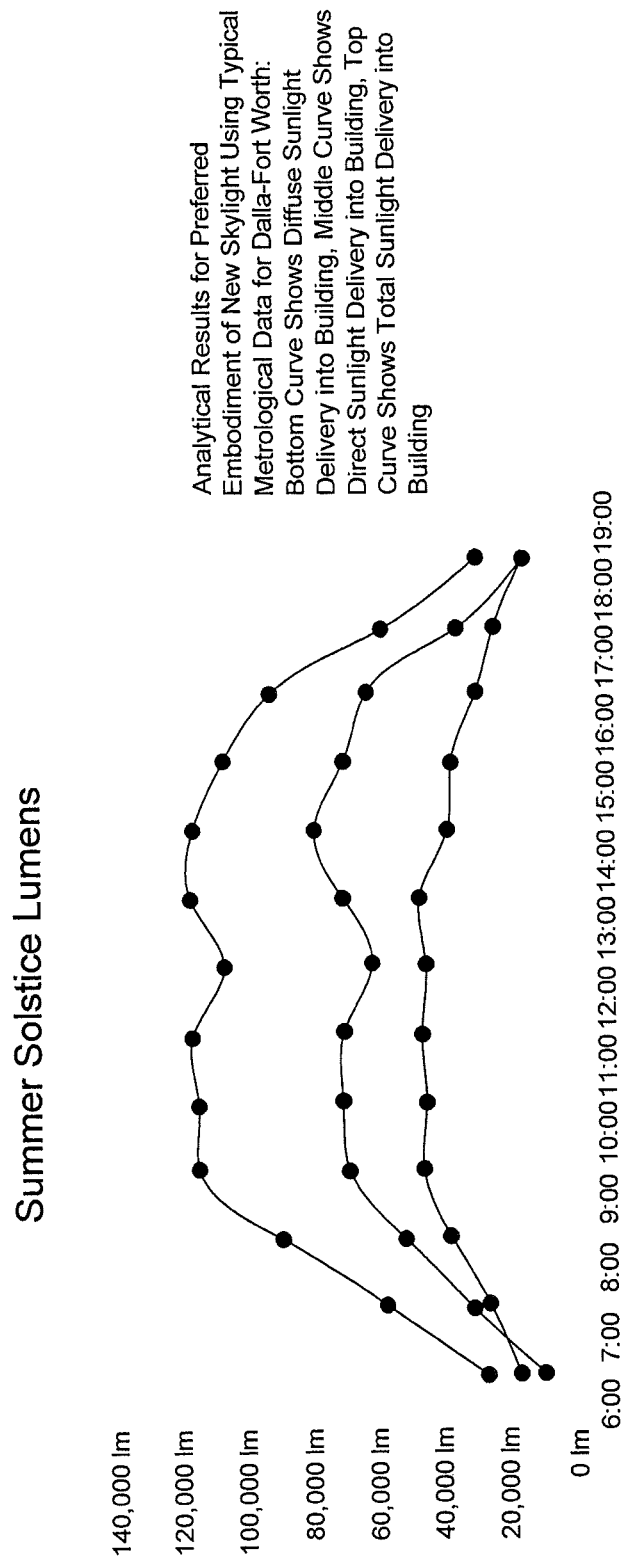
FIGS. 3A-3C illustrate the results of an analytical model of the new skylight which simulates the illumination performance of the new skylight over the principal days of the year, namely the equinox (either fall or spring) and the solstices (summer and winter).
Figure 3B:
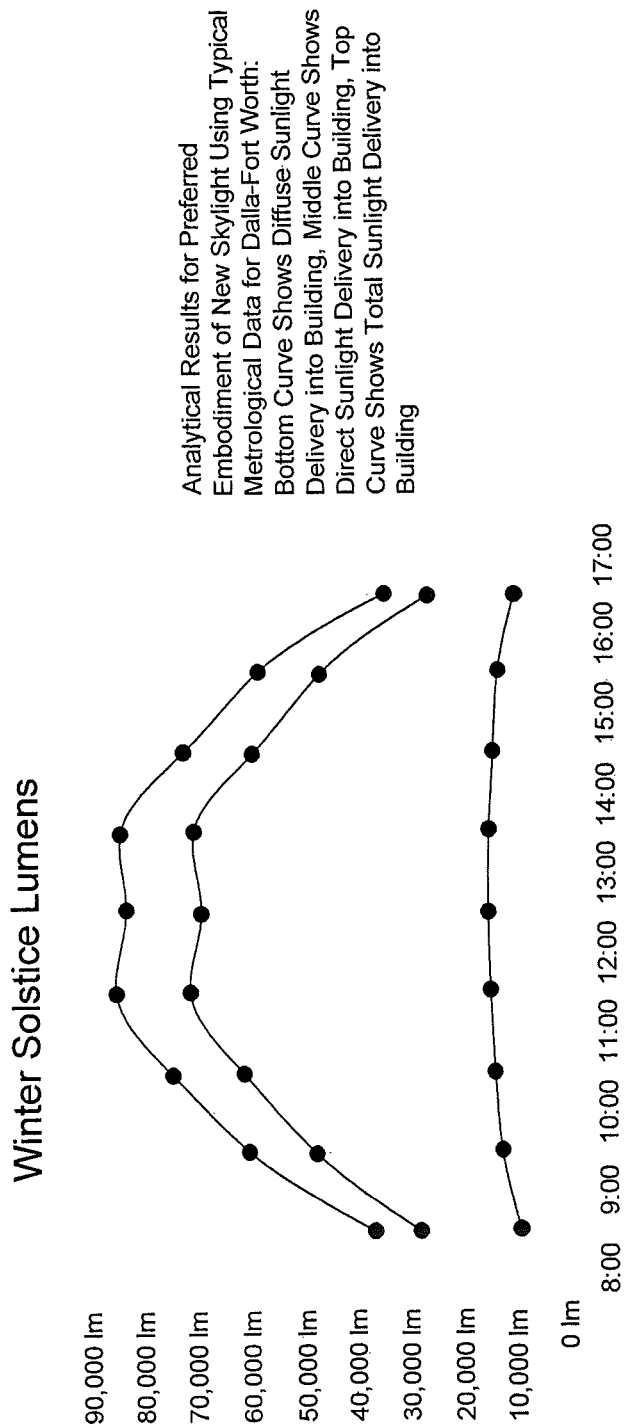
Figure 3C:
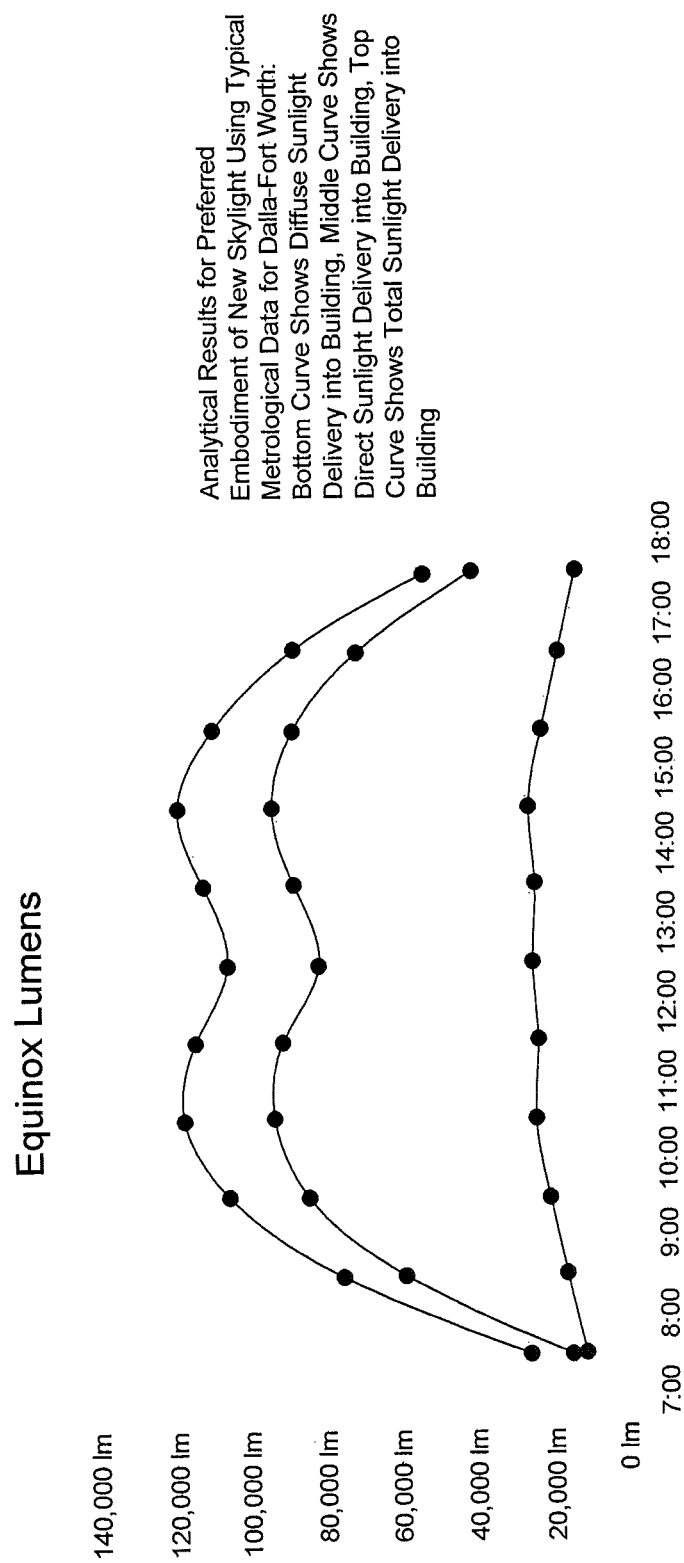

FIG. 3 shows the key analytical performance results from a combined optical ray trace analysis and a typical meteorological year data base for a skylight of the preferred embodiment of FIG. 1A. For each hour of the three principal days, equinox, summer solstice, winter solstice, a ray trace is performed for the proper sun elevation and sun azimuth angles at the center of the hour, for the location of interest. The results in FIG. 3, are for the Dallas-Fort Worth area. These hourly ray trace analyses provide the performance estimate for collection, transmission, reflection and delivery of direct solar rays for that period. Proper treatment is made of transmission losses entering the dome 2, reflection losses from the parabolic reflectors 4 and collimating reflectors in the curb 6, and transmission losses in a dual-pane diffuser 8. The direct ray lumens are calculated from the optical performance results of the appropriate hourly ray trace and the available direct illuminance from the typical meteorological year data for a clear day near the appropriate principal day, equinox or solstice. In addition to treatment of direct solar rays, the analysis further includes an estimate of the diffuse solar ray collection. The sky hemisphere is mathematically modeled as a series of small solid angle elements together adding up to the full hemisphere. A ray trace is run for each sky element, and the contribution of all the sky element, and the contribution of all the sky elements are added together with proper weighting functions for a uniformly bright sky, and including the available diffuse illuminance from the typical meteorological year data base. The bottom curve in each graph in FIG. 3 shows the diffuse sunlight delivery in lumens for a skylight using the preferred embodiment of FIG. 1A. The middle curve in each graph in FIG. 3 shows the direct sunlight delivery in lumens for a skylight using the preferred embodiment of FIG. 1A. The top curve in each graph in FIG. 3 shows the total, direct plus diffuse, sunlight delivery in lumens for a skylight using the preferred embodiment of FIG. 1A.

Figure 4A:
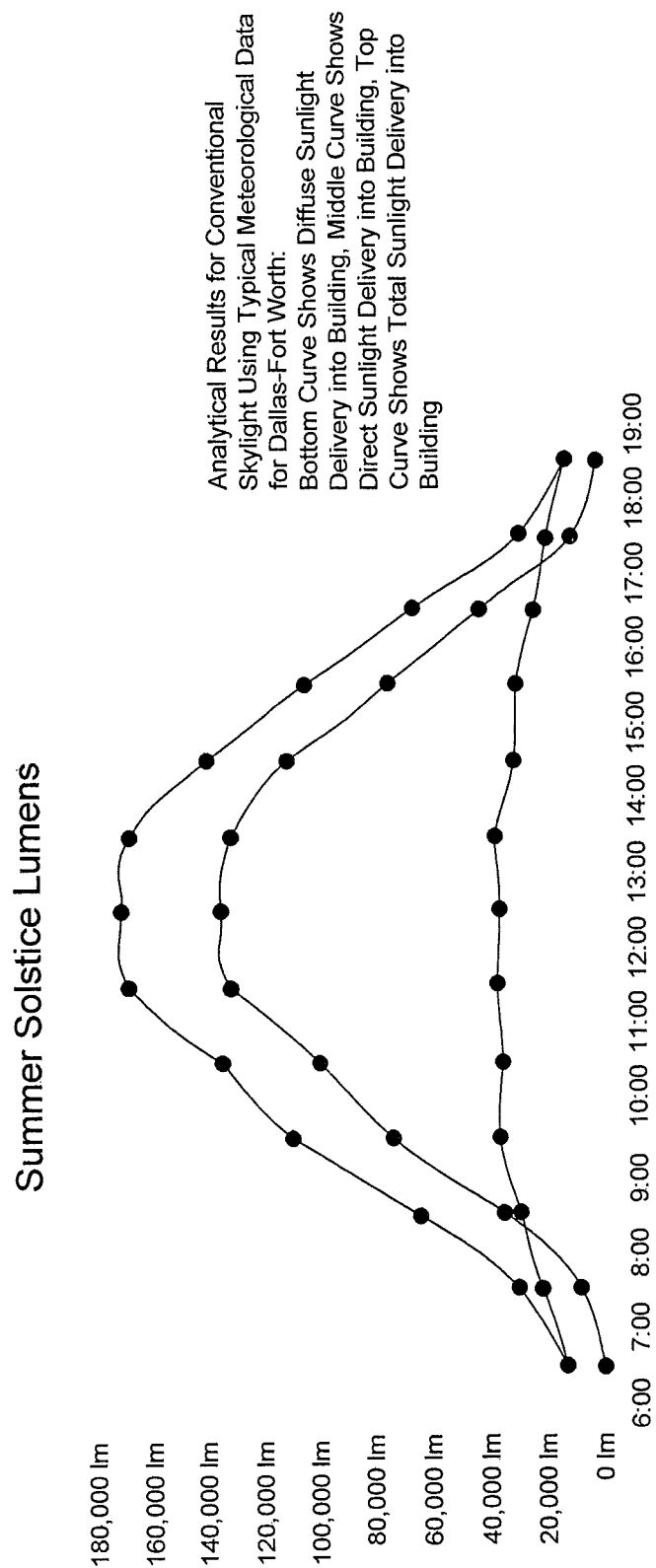
FIGS. 4A-4C illustrate the results of an analytical model of a conventional horizontal skylight which simulates the illumination performance of the conventional skylight over the principal days of the year, namely the equinox (either fall or spring) and the solstices (summer and winter).
Figure 4B:
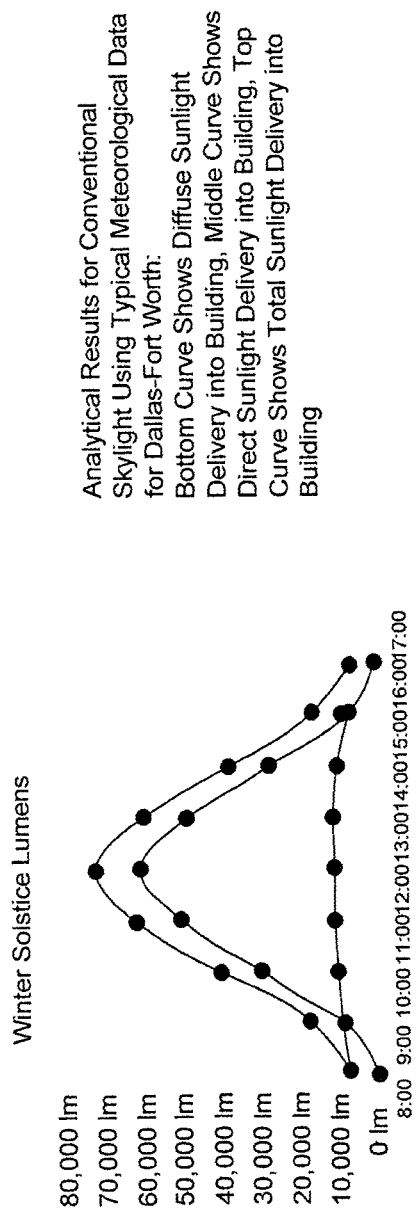
Figure 4C:
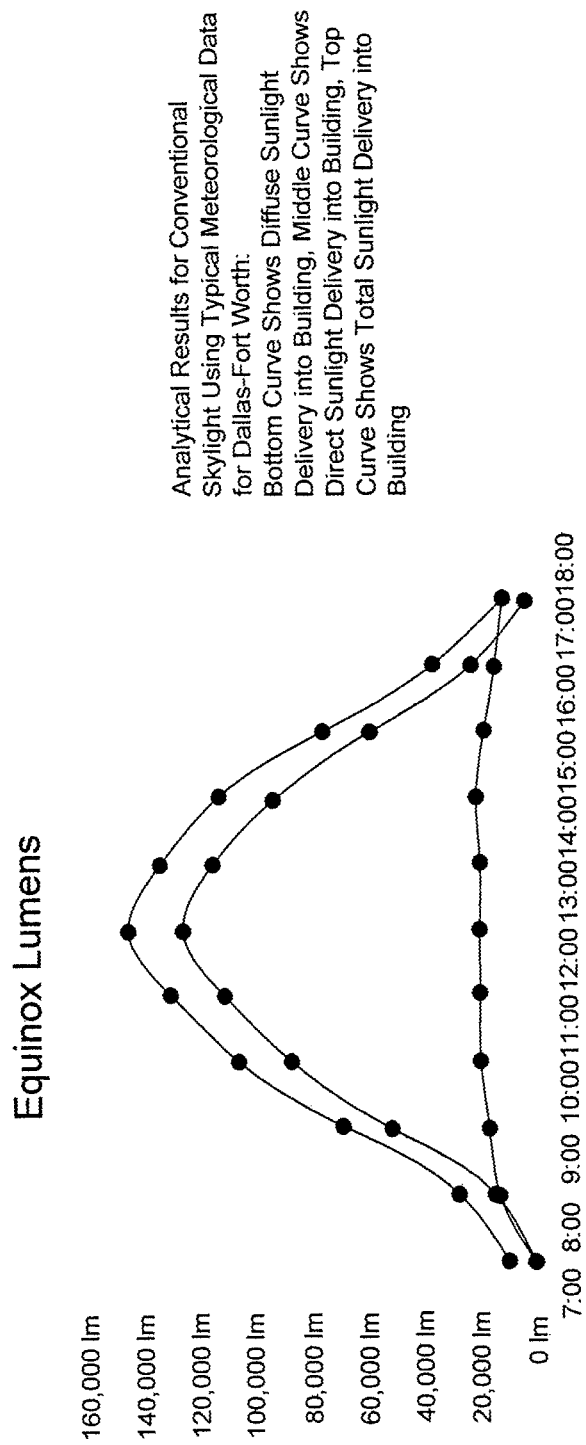
Figure 6:
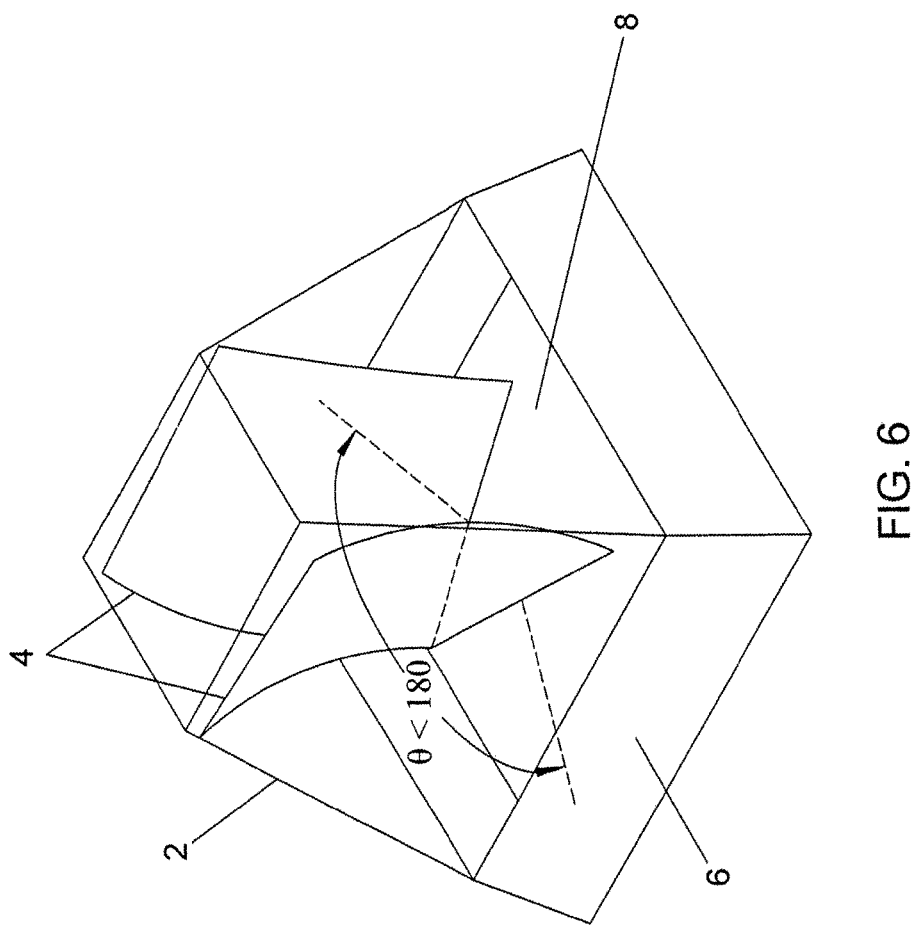
FIG. 6 illustrates a perspective view of another alternative embodiment of the new skylight, including a transparent dome shaped as a truncated pyramid, two horizon-facing parabolic reflectors arranged in a V-shaped configuration inside the dome with respective faces angled less than 180 degrees from each other for use in extreme northern and southern latitudes, a collimating curb with tilted reflective walls supporting the dome, and a dual pane diffuser assembly at the bottom of the curb.

FIG. 4 shows the key analytical performance results from a combined optical ray trace analysis and a typical meteorological year data base for a skylight of conventional flat horizontal design, without three of the key elements of the present subject matter, namely (1) the tall truncated pyramid dome 2, (2) the horizon-facing parabolic reflectors 4, and (3) the collimating curb 6. Instead, a conventional white-painted curb is assumed, and the same pair of diffusers 8 are included in the analysis of the conventional skylight with results shown in FIG. 4. For each hour of the three principal days, equinox, summer solstice, winter solstice, a ray trace is performed for the proper sun elevation and sun azimuth angles at the center of that hour, for the location of interest. The results in FIG. 3 are for the Dallas-Fort Worth area. These hourly ray trace analyses provide the performance estimate for collection, transmission, reflection, and delivery of direct solar rays for that time period. Proper treatment is made of transmission losses entering the flat dome, reflection losses the white-painted curb, and transmission losses in the dual-pane diffuser. The direct ray lumens are calculated from the optical performance results of the appropriate hourly ray trace and the available direct illuminance from the typical meteorological year data for a clear day near the appropriate principal day, equinox or solstice. In addition to treatment of direct solar rays, the analysis further includes an estimate of the diffuse solar ray collection. The sky hemisphere is mathematically modeled as a series of small solid angle elements together adding up to the full hemisphere. A ray trace is run for each sky element, and the contribution of all the sky elements are added together with proper weighting functions for a uniformly bright sky and including the available diffuse illuminance from the typical meteorological year data base. The bottom curve in each graph in FIG. 3 shows the diffuse sunlight delivery in lumens for a conventional skylight. The middle curve in each graph in FIG. 3 shows the direct sunlight delivery in lumens for a conventional skylight. The top curve in each graph in FIG. 3 shows the direct sunlight delivery in lumens for conventional skylight. The top curve in each graph in FIG. 3 shows the total, direct plus diffuse, sunlight delivery in lumens for a conventional skylight.

A comparison of the graphs in FIGS. 3 and 4 shows the enormous benefit of the new subject matter compared to conventional skylights. The amount of lumens delivered throughout the day is much more uniform for the new skylight than for the conventional skylight, and the severe peak of light, and associated solar heat gain, near solar noon each day for the conventional skylight is effectively mitigated by the new skylight.

Figure 2:
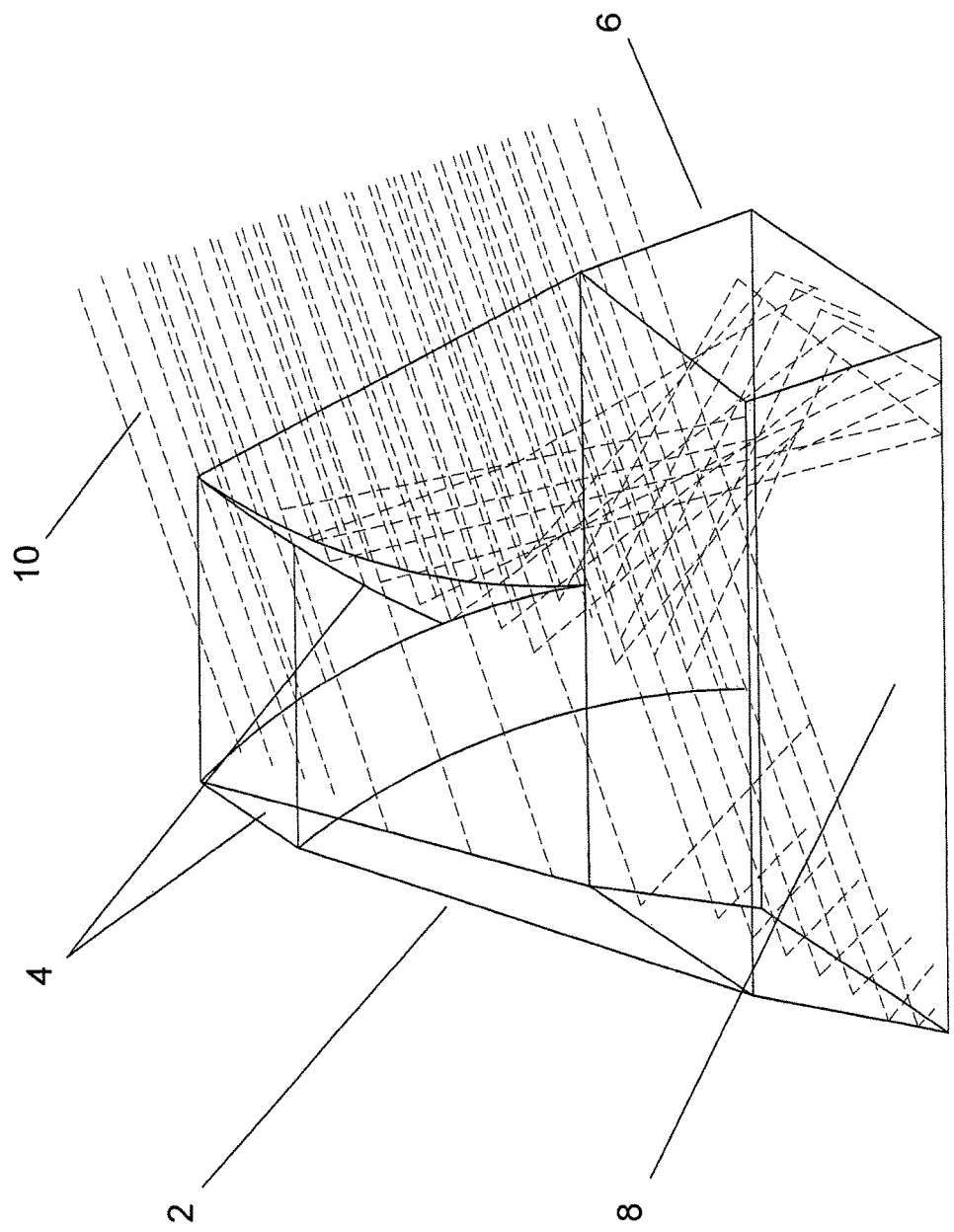
FIG. 2 is a perspective view of the preferred embodiment of the new skylight, including ray traces showing how low sun elevation angle rays are collected and reflected by the horizon-facing parabolic reflectors and the collimating curb reflective walls. The reflective surfaces on both the parabolic reflectors and the curb walls are specular reflectors, as opposed to diffuse reflectors, thereby redirecting incident rays downward and into the building beneath the curb.

FIG. 2 illustrates a perspective view of the preferred embodiment of the new skylight, including ray traces showing how low sun elevation angle rays are collected and reflected by the horizon-facing parabolic reflectors and the collimating curb reflective walls. The reflective surfaces on both the parabolic reflectors and the curb walls are specular reflectors, as opposed to diffuse reflectors, thereby redirecting incident rays downward and into the building beneath the curb.

FIG. 5 shows a perspective view from below of an alternative to the preferred embodiment of the skylight previously shown in FIG. 1, including a transparent dome 2 shaped as a truncated pyramid, two horizon-facing parabolic reflectors 4 arranged in a V-shaped configuration inside the dome, a collimating curb 6 with tilted reflective walls supporting the dome, and a dual pane diffuser assembly 8 at the bottom of the curb, with the bottom diffuser of the dual pane diffuser assembly 8 having a truncated pyramidal shape instead of the flat sheet shape of FIG. 1A. The upper diffuser of the dual pane diffuser assembly 8 in FIG. 5 remains a flat sheet as previously described for the preferred embodiment of FIG. 1A. The truncated pyramidal shape of the bottom diffuser in the dual pane diffuser assembly 8 of FIG. 5 is to further improve low sun elevation angle light delivery and to further reduce high sun elevation angle light delivery. Rays that arrive from lower sun elevation angles will tend to eventually intercept the tilted sides of the truncated pyramidal shaped bottom diffuser at lower incidence angles than for a flat bottom diffuser, thereby reducing reflection losses and increasing transmittance for such rays. Rays that arrive from higher sun elevation angles will tend to eventually intercept the tilted sides of the truncated pyramidal shaped bottom diffuser at higher incidence angles than for a flat bottom diffuser, thereby increasing reflection losses and reducing transmittance for such rays.

The preferred embodiment of the new skylight in FIG. 1A or the alternative embodiment in FIG. 5 is exemplary, and the configuration can be modified by those of ordinary skill of the art to perform the functions taught by this subject matter, while still falling within the scope and spirit of this subject matter. For example, the dome 2 of FIG. 1A could be of round geometry, with a truncated cone shape instead of a truncated pyramid shape, or the dome could be of any other shape such as hexagonal or octagonal, and still fall within the scope and spirit of the present subject matter, so long as it included the horizon-facing parabolic reflectors 4 and collimating curb 6 and dual-pane diffuser elements 8.

For the preferred embodiment shown in FIG. 1A or in the alternative embodiment in FIG. 5, the transparent dome 2 can be made from impact resistant acrylic plastic, to withstand hail and wind and sunlight exposure. The reflective surfaces of the horizon-facing parabolic reflectors 4 can be made from sheet metal coated with specularly reflective material, such as one product known as Alanod. The inward facing reflectors in the collimating curb 6 can be made from the same material as the horizon-facing parabolic reflectors 4. Many other reflective materials could be used instead of the example, Alanod, given above, while still falling within the spirit and scope of the present subject matter.

The disclosed skylight, of the embodiment shown in FIGS. 1A-C, and many other embodiments which can be conceived by those of ordinary skill in the art, offers many advantages over conventional skylights of the current state of the art. Unlike far more expensive skylight units which use motors and mechanisms to orient mirrors under the dome to help collect low sun elevation angle light, the new subject matter uses cheaper and more trouble-free non-moving mirror surfaces. Unlike conventional horizontal skylights, the new subject matter is able to collect far more low-sun-elevation-angle sunlight, providing much higher illumination early and late in the day, and in the wintertime when the sun is low in the sky all day for non-tropical latitudes. The new skylight subject matter thereby saves more energy for conventional electrical lighting, and therefore provides better economics, i.e., better return on investment and faster payback time.

The disclosed skylight of the embodiment shown in FIGS. 1A-C also directs the sunlight more vertically into the building than a conventional skylight. This places more light in the working space beneath the roof penetration, and results in less light entering the building with a more horizontal direction, causing glare and discomfort for the occupants of the building. By so directing more light vertically, the new subject matter further improves the light transmission through any translucent or transparent diffusers beneath the dome. These and other advantages of the new subject matter will be apparent to those skilled in the art of daylighting.

The disclosed skylight of the embodiment shown in FIGS. 1A-C also reduces the amount of sunlight collected near solar noon and on mid-summer days, thereby reducing the solar heat gain and corresponding air conditioning load, saving capital investment expenditures on air conditioning equipment and saving ongoing electricity costs for running such air conditioning equipment.

The truncated pyramid dome in the new skylight of FIGS. 1A and B not only increases transmittance for low sun elevation angle light by having surfaces which are nearly normal to the incoming light, but it also decreases transmittance for high sun elevation angle light because the incidence angles for high sun elevation angle light onto the sides of the dome are high. For example, for 80 degree elevation angle light where the dome is oriented NS-EW, the incidence angle onto the south face of a 39" tall acrylic dome with a 60"×60" base and a 30"×30" top is about 59 degrees with a transmittance of about 84%. The incidence angle onto the east and west sides are about 69 degrees with a transmittance of about 71% and the incidence angle onto the north side is about 80 degrees with a transmittance of about 38%. All of these transmittances are lower than the transmittance onto a bubble dome with a maximum slant of 45 degrees where the transmittances are all over 90%. The truncated pyramid dome thus reduces the solar heat gain because of its shape.

The parabolic reflectors of the disclosed skylight in FIGS. 1A-C increase the elevation angle of any light that hit them and thus decrease the incidence angle onto the top diffuser of the double-bottom diffuser assembly. The decrease in incidence angle is greatest for low sun elevation angle light that is reflected off the reflectors. Thus, the reflectors not only collect and deliver more low sun elevation angle light to the bottom diffuser assembly, but also decrease the incidence angle onto the top diffuser and thus increase the transmittance through the top diffuser. Since the decrease in incidence angle onto the top diffuser is greatest for low elevation angle light that is reflected off the reflectors, this further increases the amount of low sun elevation angle light delivered relative to the amount of high sun elevation angle light delivered.

Similarly, the collimating curb of the disclosed skylight in FIG. 1A-C reduces the incidence angle onto the top diffuser of the double bottom diffuser assembly for low sun elevation angle light that misses the parabolic reflectors and thus increases the transmittance through the top diffuser of the double bottom diffuser assembly for low sun elevation angle light that misses the parabolic reflectors and thus increases the transmittance through the top diffuser for low sun elevation angle light. Comparative testing has shown that the diffuse efficiency of a subscale model using first a straight curb with specularly reflective sides, and then with a collimating curb with specularly reflective sides, showed the latter to be better by a factor of about 110%.

The disclosed skylight of FIGS. 1A-C uses parabolic reflectors instead of straight reflectors. These have the virtue of creating a spread in the angular distribution of the reflected light which creates a smoother distribution on the floor than do straight reflectors, since straight reflectors change the direction but not the angular distribution of the incoming light.

The disclosed skylight in FIGS. 1A-B is rectangular in geometry and uses only two parabolic reflectors typically facing the east and west horizons for the following reasons: (1) Most commercial buildings are oriented north-south or east-west and on a building that is oriented with the compass directions, the rectangular skylight we can always be oriented so that the reflectors face east and west; and (2) Most low sun elevation angle light arrives with azimuths between 45 degrees and 110 degrees relative to the equator-facing direction (south in the northern hemisphere) so parabolic reflectors that face east and west will best collect this low sun elevation angle light. The inventor's team also explored, both analytically and experimentally, adding additional reflectors inside the dome, but the performance and value of the skylight was not improved compared to the use of only two parabolic reflectors. Additionally, the parabolic reflectors may be oriented at an oblique angle to each other, for instance in the far northern or southern latitudes where the winter sun requires a more southerly (e.g. ESE, WSW) and northerly (e.g. ENE, WNW) facing reflectors respectively to capture early sun. Thus, an angle between 180 degrees and 90 degrees is also envisioned.

The preferred embodiment of the new skylight of FIG. 1A or the alternative embodiments of FIGS. 1B, 1C, 4, 5 and 6 use a dual pane diffuser at the bottom of the curb to provide a thermal insulation effect with the dead air space between the two panes. The top pane of the dual pane diffuser is typically flat in either embodiment, while the bottom pane may be either flat as in FIG. 1A or shaped as in FIG. 5. The preferred material for the bottom diffuser pane of either shape is either a white-tinted acrylic sheet material or a prismatic acrylic sheet material, either of which will scatter the transmitted light into a smooth illumination pattern within the building. The preferred material for the top diffuser pane is a clear acrylic sheet or a clear polymer film. A film can offer advantages in terms of weight, cost, and transmittance, especially if the film is made from a polymer with a lower refractive index than acrylic, thereby reducing the reflection losses and increasing the transmission of light through the film compared to the sheet. One candidate film is FEP Teflon with a refractive index of 1.35 compared to acrylic with a refractive index of 1.49. A stretched film of FEP Teflon can have a normal incidence transmittance above 95%, while acrylic typically has a normal incidence transmittance of about 91%.

While the foregoing descriptions of the preferred embodiment of the new subject matter in FIGS. 1A, 1C and 5 or the alternative embodiment of the disclosed subject matter in FIG. 5 present dual pane diffusers, one of ordinary skill in the art will recognize that three-pane or four-pane diffusers could also be used while falling within the scope and spirit of the new subject matter.

While the foregoing written description of the subject matter enables one of ordinary skill to make and use what is considered presently to be the best mode thereof, those of ordinary skill will understand and appreciate the existence of variation, combination, and equivalents of the specific embodiment, method, and examples herein. The subject matter should therefore not be limited by the above described embodiment, method, and examples, but by all embodiments and methods within the scope and spirit of the subject matter.

The invention claimed is:

1. A passive skylight comprising:
    a dome to transmit light from an exterior of the dome to an interior of the dome, the dome sloping between a roof limit and a top limit;
    a curb coupled below the dome, the curb defining a light passage; and
    a first parabolic reflector and a second parabolic reflector positioned inside the dome, each reflector having a concave surface, each reflector positioned to direct substantially horizontal light incident on the concave surface downward through the light passage.

2. The skylight of claim 1 further comprising:
    a diffuser coupled to the curb in an optical path of light reflected by the reflectors.

3. The skylight of claim 2 wherein the diffuser comprises:
    a shallow truncated pyramid extending downward from the curb, and a slant from vertical of the shallow truncated pyramid is greater than a slope of the dome.

4. The skylight of claim 1 wherein the first reflector is oriented in the range of 90° to 180° relative to the second reflector.

5. The skylight of claim 1 wherein the first and second reflectors each extend between a plane at the roof limit and the top limit.

6. The skylight of claim 1 wherein the curb comprises slanted reflective internal walls.

7. The skylight of claim 1 wherein the first and second reflectors are oppositely directed relative to a horizon.

8. The skylight of claim 1 wherein the first and second reflectors abut at a lower edge of the respective reflectors and the lower edge, when installed, is oriented in a predominantly north-south direction.

9. The skylight of claim 1 wherein a height of the top limit above the roof limit is greater than fifty percent of the maximum perpendicular cross dimension between two sides of the curb.

10. The skylight of claim 1 wherein the dome comprises:
    a plurality of oppositely directed side pairs that collectively define the gross geometry of the dome between the roof limit and the top limit.

11. The skylight of claim 10 wherein the first and second reflectors face a first and a second side respectively and are both coupled between a third and a fourth side of the dome, wherein the first side and second side are a first oppositely directed side pair and the third side and fourth side are a second oppositely directed side pair.

12. The skylight of claim 10 wherein the side pairs define a gross geometry of a truncated pyramid.

13. A method of providing morning and evening interior illumination and preventing heating by the midday sun, comprising:
    positioning a skylight assembly over a light passage in a roof of a structure, wherein the skylight assembly is exposed to high sun elevation angle light rays during midday hours and low sun elevation angle light rays during the morning and evening hours;
    allowing the low sun elevation angle light rays to pass through a steeply sloping side of a dome of the skylight assembly;
    reflecting low sun elevation angle light rays with at least one of a pair of parabolic reflectors into the light passage; and
    reducing the high sun elevation angle light rays incident upon skylight assembly that reach the light passage.

14. The method of claim 13 wherein reducing comprises:
    reflecting the high sun elevation angle light rays incident on the dome away from the light passage.

15. The method of claim 13 further comprising:
    diffusing light entering the light passage before transmission into the structure.

16. The method of claim 13 wherein positioning comprises:
    installing the assembly so that members of the pair of parabolic reflectors substantially faces each of an east and a west horizon.

* * * * *